(12) United States Patent
Katz et al.

(10) Patent No.: US 6,807,223 B2
(45) Date of Patent: Oct. 19, 2004

(54) METHOD OF PERFORMING CODE SYNCHRONIZATION, AND RECEIVER

(75) Inventors: Marcos Katz, Oulu (FI); Savo Glisic, Oulu (FI); Jari Iinatti, Oulu (FI)

(73) Assignee: Nokia Corporation, Espoo (FI)

( * ) Notice: Subject to any disclaimer, the term of this patent is extended or adjusted under 35 U.S.C. 154(b) by 97 days.

(21) Appl. No.: 10/215,195

(22) Filed: Aug. 9, 2002

(65) Prior Publication Data

US 2003/0076876 A1 Apr. 24, 2003

Related U.S. Application Data

(63) Continuation of application No. PCT/FI01/00116, filed on Feb. 8, 2001.

(30) Foreign Application Priority Data

Feb. 9, 2000 (FI) .............................................. 20000273

(51) Int. Cl.[7] .............................................. H04B 1/707
(52) U.S. Cl. ...................................................... 375/149
(58) Field of Search ................................ 375/347, 149, 375/346, 267, 140, 260, 299, 341, 224; 370/210, 252, 342, 509, 335, 337; 455/562.165

(56) References Cited

U.S. PATENT DOCUMENTS

| 5,642,377 | A |   | 6/1997 | Chung et al. |
| 5,894,598 | A | * | 4/1999 | Shoki ....................... 455/562.1 |
| 6,091,788 | A | * | 7/2000 | Keskitalo et al. ........... 375/347 |
| 6,118,767 | A | * | 9/2000 | Shen et al. ................. 370/252 |
| 6,363,049 | B1 | * | 3/2002 | Chung ........................ 370/210 |
| 6,414,951 | B1 | * | 7/2002 | Ozluturk et al. ............ 370/342 |

FOREIGN PATENT DOCUMENTS

| EP | 806 844 | 11/1997 |
| EP | 945 994 | 9/1999 |
| WO | WO 98/27669 | 6/1998 |
| WO | WO 00/36765 | 6/2000 |

OTHER PUBLICATIONS

Simon et al., *Spread Spectrum Communications Handbook*, McGraw–Hill, Revised Edition, pp. 768–771.

Katz et al., "Two–Dimensional Code Acquisition Using Antenna Arrays," IEEE 6th Int. Symp. on Spread–Spectrum Tech & Appln. NJIT, New Hewsey, Sep.6–8, 2000, pp. 613–617.

* cited by examiner

*Primary Examiner*—Stephen Chin
*Assistant Examiner*—Ted Wang
(74) *Attorney, Agent, or Firm*—Pillsbury Winthrop LLP

(57) ABSTRACT

The invention relates to a method of performing code acquisition on a signal to be received and to a receiver implementing the method. In the method the receiver receives a signal from a transmitter by at least two antenna beams, and to perform code acquisition, the antenna beams formed are searched at different delays of the spreading code. The number M of antenna beams can also be changed adaptively by determining a signal-to-noise ratio and by forming a number of antenna beams which is proportional to the signal-to-noise ratio. The receiver performs code acquisition by receiving a signal from the transmitter and by searching the antenna beams formed at the different delays of the spreading code.

19 Claims, 5 Drawing Sheets

METHOD OF PERFORMING CODE SYNCHRONIZATION, AND RECEIVER

This is a Continuation of International Application PCT/FI01/00116 filed on the 8$^{th}$ of Feb. 2001 which designated the U.S. and was published under PCT Article 2(2) in English.

FIELD OF THE INVENTION

The invention relates to synchronization of a receiver with a signal to be received.

BACKGROUND OF THE INVENTION

In the CMDA (Code Division Multiple Access) the user's narrowband data signal is modulated onto a relatively wide band with a spreading code which has a wider band than the data signal. In prior art CDMA systems bandwidths of over 1 MHz are used. In the WCDMA (Wide-band CDMA) the bandwidth is considerably greater so that the users of mobile communications networks can be offered a wider range of services.

The spreading code used in the CDMA system usually consists of a long pseudorandom bit sequence. The bit rate of the spreading code is much higher than that of the data signal. The spreading code bits are called 'chips' to distinguish them from the data bits and symbols. Each of the user's data symbols is multiplied by spreading code chips. In that case a narrowband data signal spreads over the frequency band used by the spreading code. Each user has a spreading code of their own. The length of a spreading code may be one or more data bits. Several users transmit simultaneously on the same frequency band, and the data signals are distinguished from one another in receivers on the basis of a pseudorandom spreading code.

In spread spectrum systems, such as the CDMA system, the receiver has to synchronize with the signal to be received so that the signal can be modulated and detected. Code synchronization is usually divided into two parts: code acquisition and code tracking. In code acquisition the object is to achieve a maximum timing difference of one spreading code chip between the spreading code of the receiver's code generator and the spreading code of the received signal. To achieve this, the spreading code of the receiver's code generator is delayed chip by chip, and the delay between the spreading code of the signal and the spreading code of the code generator is searched for. In code tracking the object is to achieve as small timing inaccuracy as possible, which is only a fraction of a chip.

Code acquisition is performed using e.g. a simple correlator. When the spreading code of the signal to be received and the spreading code of the receiver's code generator are not synchronized, the output of the correlator receives a low value. When the spreading code of the signal to be received and the spreading code of the receiver's code generator are synchronous, i.e. the delay of code generator's spreading code is correct, the initial value of the correlator is high. A corresponding result is obtained when a matched filter is used.

In such code acquisition problems are caused by interferences and noise. Multiple access interference MAI, for example, causes high momentary values at the output of the correlator, even though the spreading code of the signal to be received and the code of the code generator would be non-synchronous. This leads to a false alarm and protracted code acquisition. To reduce the influence of false alarms, the delay obtained in code acquisition has to be confirmed with another correlation measurement, which prolongs synchronization.

BRIEF DESCRIPTION OF THE INVENTION

An object of the invention is to provide a method and a receiver implementing the method to reduce the problems related to code acquisition and to speed up code acquisition. This is achieved with a method according to claims 1 and 2 and with a receiver according to claims 13 and 14.

The preferred embodiments of the invention are disclosed in the dependent claims.

The invention is based on performing code acquisition two-dimensionally both in the time domain and in the angular domain. In the angular domain code acquisition is performed using several adjacent antenna beams, i.e. angular cells.

The method and arrangement of the invention provide several advantages. Code acquisition can be sped up considerably in noisy multi-use environment even when the number of angular cells is not optimal with respect to the signal to noise ratio.

BRIEF DESCRIPTION OF THE DRAWINGS

The invention will be described in greater detail by means of preferred embodiments with reference to the accompanying drawings, in which.

DETAILED DESCRIPTION OF THE INVENTION

The solution according to the invention is particularly suitable for a CDMA radio system which utilizes the direct spreading technique. Other applications include satellite systems, military telecommunications systems and private non-cellular networks. However, the solution according to the invention is not limited to these applications.

Figure 1:
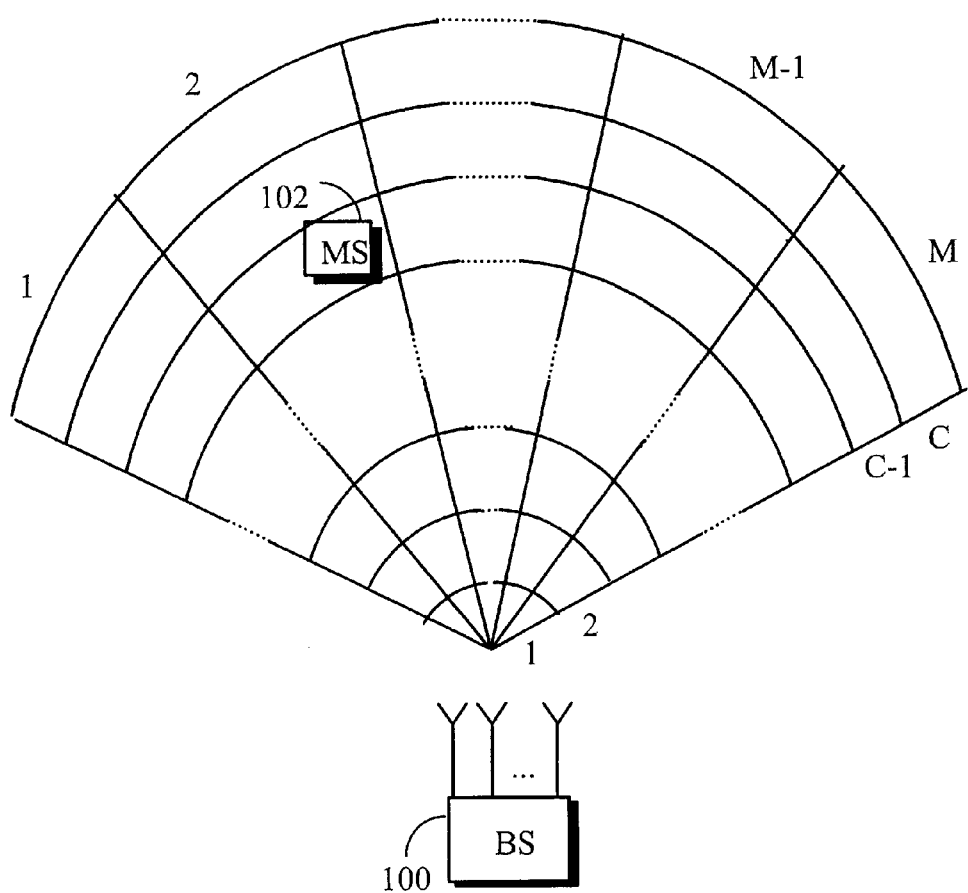
FIG. 1 illustrates two-dimensional code acquisition.

The present solution will be first described with reference to FIG. 1. A receiver 100, which comprises an antenna array, is a base station of a radio system, for example. The base station 100 receives a signal from a terminal 102, which is e.g. a mobile station. By means of the antenna array the base station 100 can receive signals from adjacent sectors which correspond to the directions of the receiving beams of the antenna array. The number M of antenna beams, which is defined as the number of angular cells, is not constant, but the number of angular cells can be changed at different moments. The number M of angular cells is changed adaptively according to the signal-to-interference ratio (noise is also taken into account in the signal-to-interference ratio). The coverage area, which is independent of the number of receiving beams, can be divided into two or more sectors. The spread angles of all sectors are preferably equal, even though the spread angles can also be of different sizes in the present solution. Adjacent antenna beams opening out into the sectors do not overlap. Performance of code acquisition in different sectors means angular code acquisition in which the inaccuracy of code acquisition to be performed in the angular domain depends on the spread angle of the sector.

Code acquisition is performed in the time domain in a manner known per se, i.e. one goes through all delays of the spreading code. The number of delays to be tested is determined by the number $N_C$ of the spreading code chips. The number C of delays to be tested during the duration of the spreading code defines a time cell, which may have e.g. a duration of one chip or shorter (the duration of the time cell is selected so that the desired accuracy can be achieved). When the number of angular cells is M and the number of delays to be searched for is C, code acquisition is performed in two domains in Q=MC cells altogether. Code acquisition can be performed in all cells Q in any order. For example, code acquisition can be performed by searching all time cells in each angular cell, after which the same will be performed in the next angular cell. Code acquisition can also be performed e.g. by searching all angular cells in each time cell.

Figure 2:
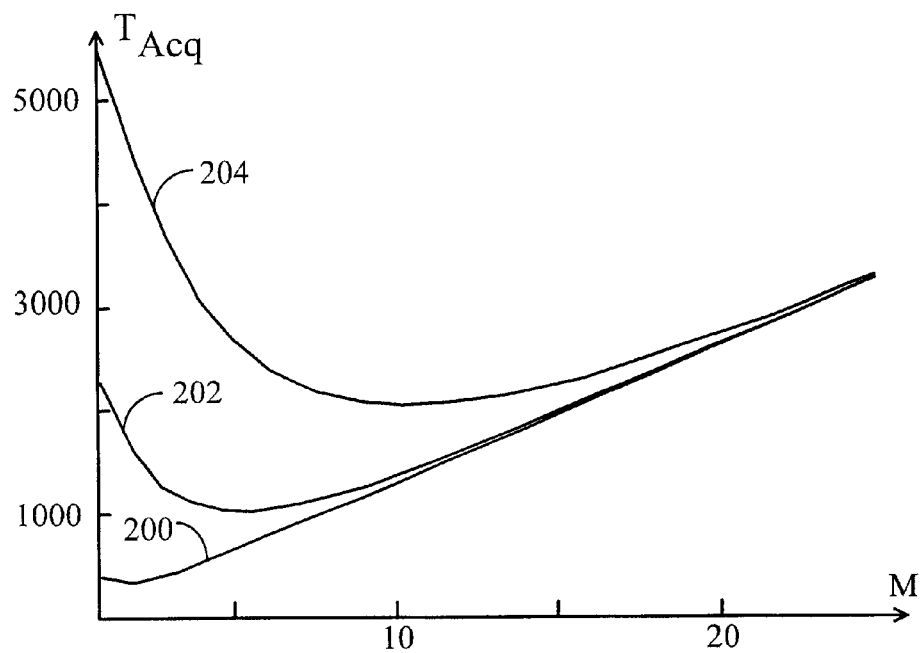
FIG. 2 illustrates average duration of code acquisition as a function of the number of antenna elements at different signal-to-noise ratios.
Figure 3:
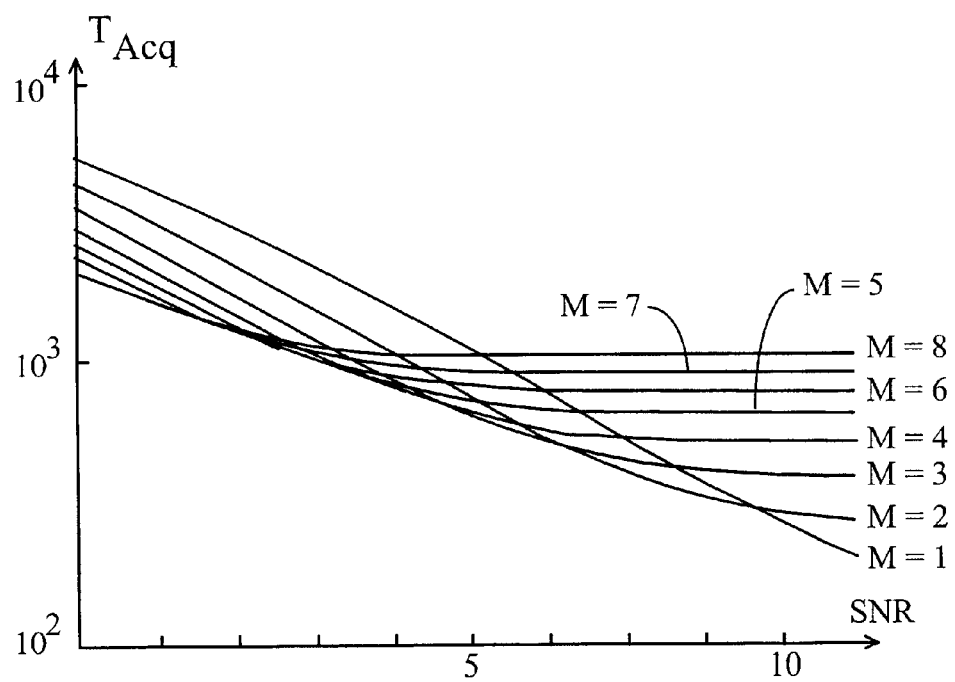
FIG. 3 illustrates duration of code acquisition as a function of the signal to noise ratio.

In the solution according to the invention the essential factors are the signal-to-noise ratio and the number M of angular cells, i.e. antenna beams. A poor signal-to-noise ratio also increases the code acquisition time. On the other hand, the signal-to-noise ratio can be improved with a large number of angular cells because the antenna gain increases. However, the larger the number of angular cells, the longer the code acquisition time. FIGS. 2 and 3 show different simulated situations which illustrate the code acquisition time as a function of the number of angular cells and signal-to-noise ratio. In both figures the number C of time cells is 256.

FIG. 2 illustrates the average code acquisition time $T_{ACQ}$ as multiples of code sequence, and as a function of the number M of angle cells at different signal-to-noise ratios. The lowest curve 200 shows a situation in which the signal-to-noise ratio SNR is 8 dB, the second lowest curve 202 a situation in which the SNR=3 dB, and the top curve 204 a situation in which the SNR=0 dB. As regards the behaviour of the curves, it should be noted that the code acquisition time achieves its minimum with a certain number of angular cells, which depends on the signal-to-noise ratio. Since in the situation illustrated by curve 200 the signal to be received is considerably stronger than the interference, the code acquisition time is at its shortest with two angular cells. Nearly the same code acquisition time is also achieved with one angular cell. When the signal-to-noise ratio decreases to 3 dB in the case of curve 202, the most optimal number of angular cells is six in respect of code acquisition. It should be noted that, compared to the use of one angular cell, the code acquisition time decreases considerably even with two angular cells. When the signal-to-noise ratio is 0 dB, i.e. the level of the signal to be received is the same as that of the interference(s), the code acquisition time is at its shortest with ten angular cells in the case of curve 204. Furthermore, in this case the code acquisition time first decreases rapidly as a function of the increased number of angular cells, for which reason it is not necessary to know the exact signal-to-noise ratio to reduce the code acquisition time efficiently.

FIG. 3 illustrates the code acquisition time as a function of the signal-to-noise ratio with different numbers of angular cells. In this figure the code acquisition time is shown on a logarithmic scale. It can be seen in FIG. 3 that the number M of angular cells needed increases rapidly as the signal-to-noise ratio deteriorates. When the signal-to-noise ratio exceeds 9 dB, code acquisition is fastest with one angular cell. When the signal-to-noise ratio is between 1 dB and 0 dB, it is best to use eight angular cells. In FIGS. 2 and 3 the optimal threshold is used as the threshold for decision on synchronization.

Figure 4A:
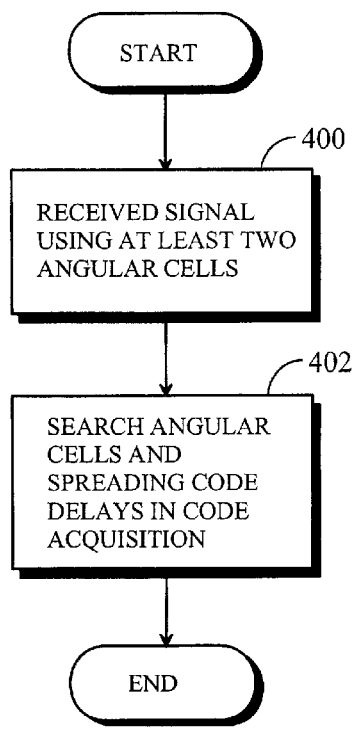
FIG. 4A is a flow chart of code acquisition.

FIG. 4A is a flow chart of code acquisition. In block 400 a signal is received using at least two angular cells. In block 402 the delays (time cells) of antenna beams (angular cells) are searched in a desired order to find the delay at which the spreading code of the receiver's code generator synchronizes with the signal spreading code.

Figure 4B:
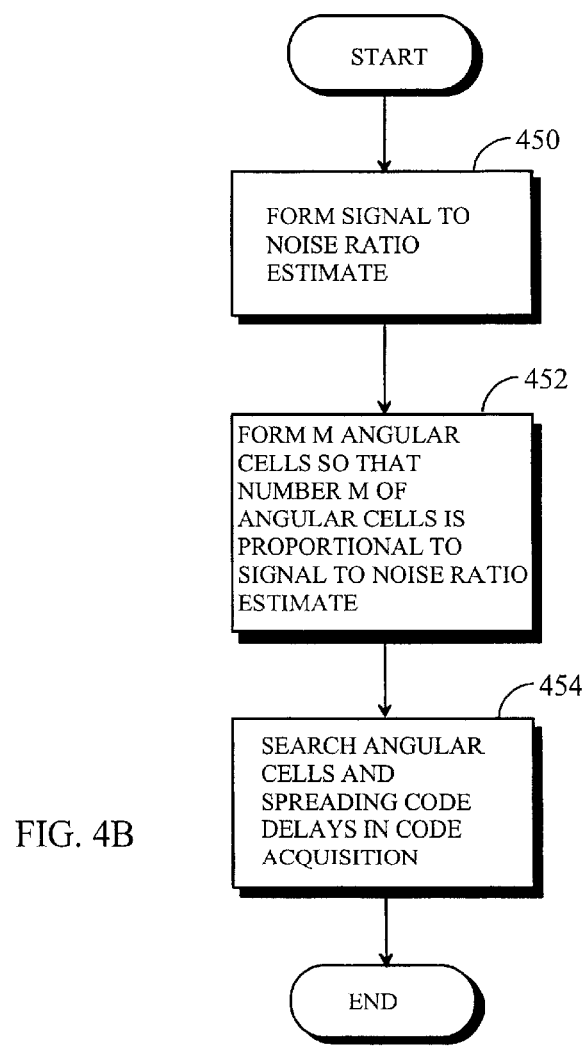
FIG. 4B is a flow chart of code acquisition.

FIG. 4B is also a flow chart of code acquisition. In block 450 an estimate is formed from the ratio of the level of the signal to be received to the level of interferences. The levels of the signal and the interferences are preferably measured as root-mean-square values. The signal-to-noise ratio can be estimated only by means of the interference level when it is assumed that the signal level is a constant value or when such a value is set for it. In block 452 a number of angular cells which is proportional to the signal-to-noise ratio estimate is formed, and a signal is received. If the signal level is assumed to have a constant value or such a value is set for it, the number of angular cells needed can in practice be determined inversely proportionally with respect to the signal-to-noise ratio. It is not necessary to determine the exact number of angular cells by means of the signal-to-noise ratio estimate, but it is sufficient to increase the number of angular cells by a desired number if the amount of interference increases or the estimated signal-to-noise ratio deteriorates. If the amount of interference decreases or the estimated signal-to-noise ratio improves, the number of angular cells can be reduced if more than one angular cell is in use. Code acquisition is performed in block 454 by searching the angular cells formed at the delays of the spreading code.

It may be difficult to measure the signal-to-noise ratio of the signal to be received because the signal to be received has not been synchronized and thus it has not been received for the measurements. For this reason, the signal-to-noise ratio of the signal to be received often has to be estimated otherwise.

When the CFAR principle (Constant False Alarm Rate) is used, the probability $P_{FA}$ of false alarm can be selected as desired. The probability $P_{FA}$ of false alarm means the probability at which code acquisition results in the wrong delay of the spreading code. The following procedures are performed when the CFAR principle is used. The interference level is measured. Instead of the actual measurement, the interference level can be estimated e.g. on the basis of the number of users. The signal-to-noise ratio can be determined by setting an assumed power for a synchronization request signal, i.e. it is assumed that the signal arrives at a certain power. The terminal usually transmits a signal in proportion to the power at which the terminal receives the signal. Thus the path attenuation is cancelled out and the power of the signal arriving from the terminal can be estimated at the base station. The signal-to-noise ratio can be used for determining the number of angular cells needed. However, to be able to calculate the number of angular cells, one needs information on the threshold $T_H$ used for deciding on synchronization (selection of the optimal threshold may cause problems). This threshold value can be calculated utilizing the assumption that the probability $P_{FA}$ of false alarm is constant. Thus the probability $P_{FA}$ of false alarm can be selected freely. The threshold $T_H$ is calculated according to the probability $P_{FA}$ of false alarm.

The probability of false alarm will now be described in greater detail. The probability function of the decision variable that leads to a false alarm follows the Rayleigh distribution, and the probability $P_{FA}$ of false alarm can be calculated by integrating the Rayleigh distribution from the threshold value to infinity as follows:

$$P_{FA} = \int_{T_H}^{\infty} \frac{y}{\sigma^2} \exp\left(\frac{-y^2}{2\sigma^2}\right) dy = \exp\left(\frac{-T_H^2}{2\sigma^2}\right),$$

where y is the received signal and $$y = \sqrt{y_I^2 + y_Q^2},$$

$\sigma^2$ is the variance of variables $y_I$ and $y_Q$, i.e. the root-mean-square value of interferences, $T_H$ is the threshold used for deciding on synchronization, $y_I$ and $y_Q$ are signal components according to IQ modulation (IQ modulation is obvious to a person skilled in the art). The threshold$_{HCFAR}$ can be calculated from this as follows:

$$T_{HCFAR} = \sqrt{-2\sigma^2 \ln(P_{FA})}.$$

Figure 5:
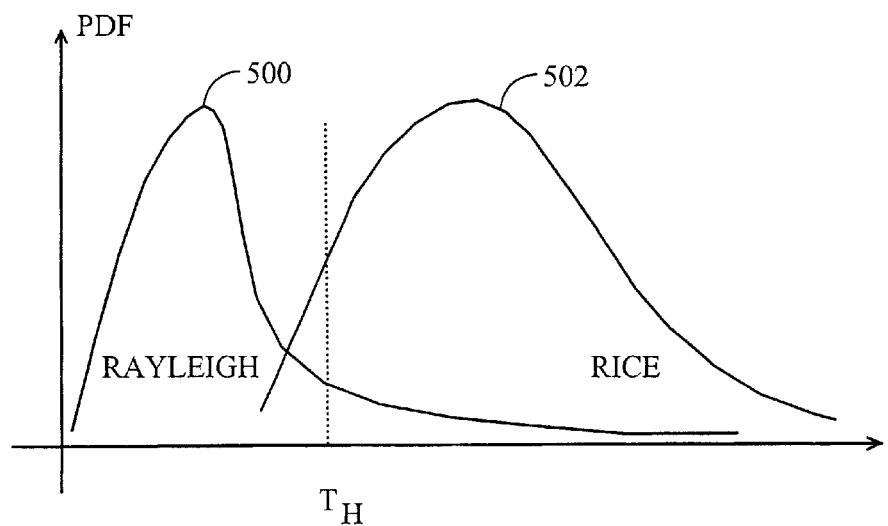
FIG. 5 illustrates probability density distribution of the decision variable that leads to a false alarm, and probability density distribution of the decision variable that leads to the correct decision.

The probability of finding the correct code delay is calculated as follows:

$$P_D = \int_{T_H}^{\infty} \frac{y}{\sigma^2} \exp\left(\frac{-(y^2+s^2)}{2\sigma^2}\right) I_0\left(\frac{ys}{\sigma^2}\right) dy,$$

where $s^2 = m_I^2 + m_Q^2$ is the parameter of eccentricity, where $m_I$ is the average of signal component $y_I$ and $m_Q$ is the average of signal component $y_Q$, $I_0$ is a modified Bessel function of the zeroth order of the first type. These distributions are shown in FIG. 5. Curve 500 shows the probability density function of a Rayleigh-distributed decision variable, and curve 502 shows the Rice-distributed probability density function of the correct decision variable. The distances between the greatest values of the distributions depend on the levels of the interferences and the signal to be received. By setting the threshold value $T_{HCFAR}$ to the desired value, the probability of correct decision can also be estimated when the level of the signal to be received or the signal-to-noise ratio is known, can be estimated or is set.

The average code acquisition time can be expressed as follows:

$$\overline{T}_{acq} = \frac{2 + (2 - P_D)(Q - 1)(1 + KP_{FA})}{2P_D} \tau_d,$$

where $\tau_d$ is the time needed for calculating the decision variable (integration time in FIG. 7), K is related to the dead time ($K\tau_d$) of false alarm, and Q=MC. The dead time means the time needed for recovery from a false alarm. When the number M of angular cells is increased, the signal-to-noise ratio increases, the probability $P_D$ of correct code acquisition increases and the probability $P_{FA}$ of false alarm decreases. It appears from the formula that this leads to a shorter code acquisition time $\overline{T}_{acq}$. The signal-to-noise ratio increases as the number of angular cells is increased, and at the same time the number Q of cells also increases. The larger the number Q of cells, the longer the code acquisition time $\overline{T}_{acq}$ will be. This is explained more closely in *Spread Spectrum Communication Handbook*, M. Simon, J. Omura, R. Scholtz and B. Levitt, McGraw Hill, Inc., 1994, pages 768–770, which is incorporated herein by reference.

Figure 6:
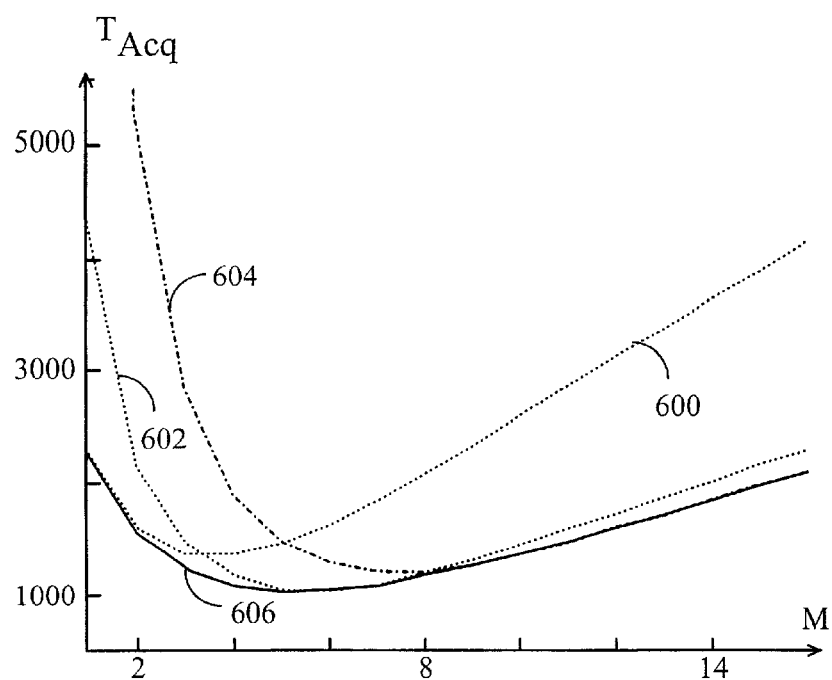
FIG. 6 illustrates the average duration of code acquisition at different values of the probability of false alarm.

FIG. 6 illustrates the code acquisition time as a function of angular cells at different $P_{FA}$ values. It is assumed that the signal-to-noise ratio SNR is 3 dB. The different curves have been obtained by changing the probability $P_{FA}$ of false alarm, which changes the threshold $T_H$ for the decision on synchronization. When the threshold for the synchronization decision changes, the code acquisition time also changes in accordance with the curves. The first curve 600 shows a situation in which the probability of false alarm is set to value $P_{FA}$=0.01. According to this curve, the optimal number M of angular cells is three or four. The second curve 602 illustrates a situation in which the probability of false alarm is set to value $P_{FA}$=0.001. In this case the optimal number M of angular cells is five or six. In the case of the third curve 604 the probability of false alarm is set to value $P_{FA}$=0.0001. Here the optimal number M of angular cells is eight. For example, $P_{FA}$=0.001 could be selected as the probability of false alarm. The curve 602 corresponding to this value follows rather well an optimal curve 606 defined by means of the actual signal-to-noise ratio. In the solution according to the invention the objective is to find a number of angular cells which reduces the code acquisition time. In that case the best number of angular cells is such that the code acquisition time reaches its minimum. This applies to FIGS. 2, 3 and 6.

Figure 7:
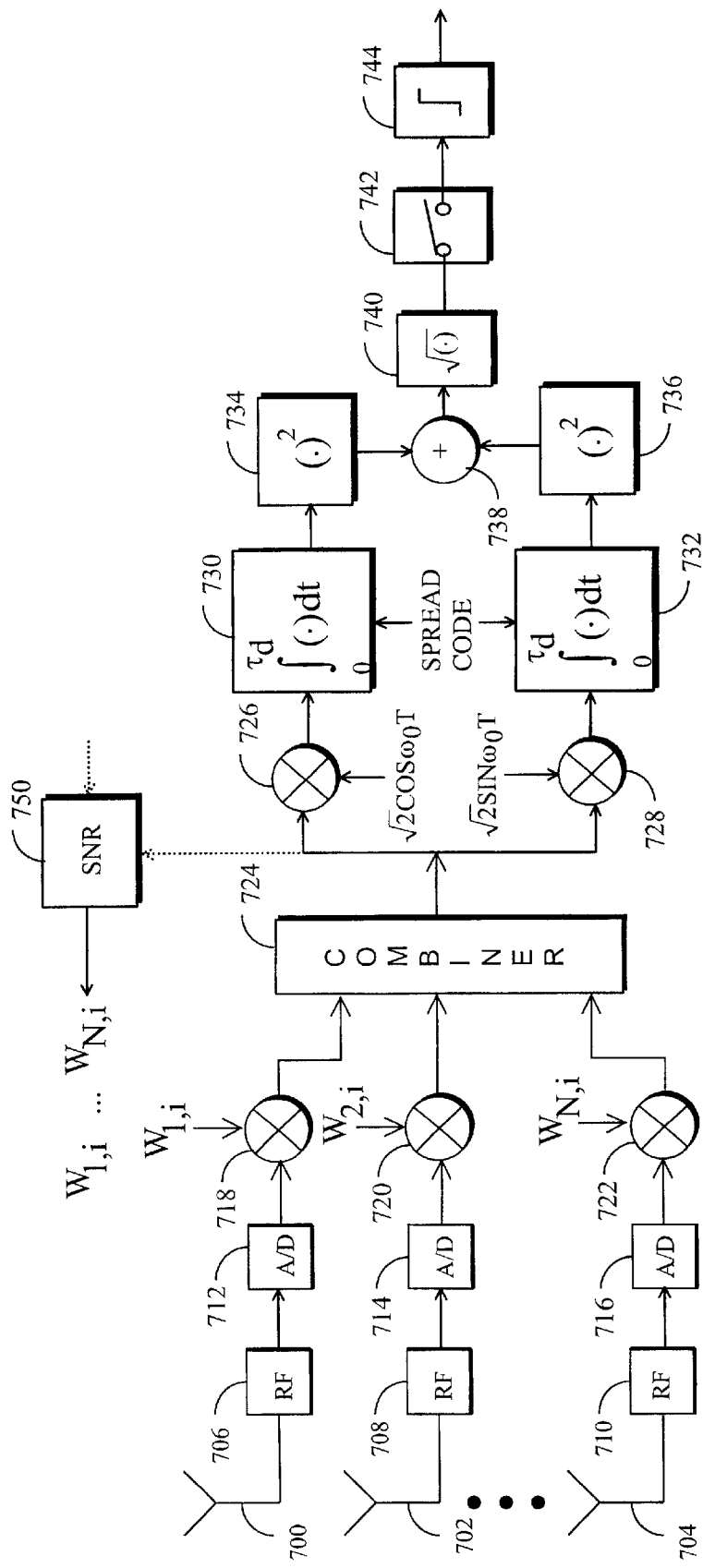
FIG. 7 is a block diagram of a receiver.

FIG. 7 is a block diagram illustrating one feasible embodiment of the receiver. The receiver comprises blocks that function according to the prior art, but in respect of code acquisition the function of the receiver differs essentially from the prior art. Signals are received by an antenna array, which comprises several antenna elements 700 to 704. From the antenna elements 700 to 704 the signals propagate to radio frequency means 706 to 710, in which the received signal is transferred from the radio frequency to the base band. A base band analogue signal is converted into a digital signal in an A/D converter 712 to 716. Digital signals are multiplied by weighting coefficients $W_{1,i}$–$W_{N,i}$ in multipliers 718 to 722. The values of the weighting coefficients $W_{1,i}$–$W_{N,i}$ are determined in a signal-to-noise ratio estimator 750, in which the signal-to-noise ratio is estimated. The signal-to-noise ratio can be estimated in various ways, and thus block 750 can receive information related to the estimation of the signal-to-noise ratio from several parts of the receiver/base station. The weighted signals are combined in a combiner 724. Multiplication and combination of the signals provides the desired angular cell. Different coefficients are needed to determine different angular cells. For this reason, the weighting coefficients form a set (matrix) including N coefficient vectors N, each of which comprises N elements in which N is the maximum number of angular cells (corresponds to the number of antenna elements). Each vector at a time is selected as the weighting coefficient for forming a certain antenna beam. The set can be presented as a matrix $$\begin{bmatrix} w_{1,1} & \cdots & w_{N,1} \\ \vdots & \ddots & \vdots \\ w_{1,N} & \cdots & w_{N,N} \end{bmatrix}$$

where N is the number of antenna elements and the maximum number of angular cells. The weighting coefficients are typically complex coefficients. If the number M of angular cells needed is smaller than the maximum N number of angular cells, (N–M) weighting coefficients can be set to zero and M weighting coefficients can be formed, which yields M angular cells. Angular cells can also be modified analogically by phasing the radio band signals transmitted to different antenna elements in a desired way. This fact as well as the use of digital weighting coefficients for directing and modifying an angular cell are obvious to a person skilled in the art, for which reason these are not described in greater detail here.

After the weighted signals have been combined, code acquisition is performed in the time domain in a manner known per se using an incoherent correlator or a matched filter. In that case the weighted and combined signal is divided into two parts. The first signal is multiplied in a multiplier 726 by the signal $\sqrt{2}\cos(\omega_0 t)$ of local oscillator (not shown) and the second signal is multiplied by the signal $\sqrt{2}\sin(\omega_0 t)$ with an orthogonal phase in a multiplier 728. After this, both multiplied signals are correlated with a spreading code in correlators 730 and 732. Instead of the correlators 730 and 732, a matched filter can also be used, the filter being matched to the spreading code to be searched for in a manner known per se. The result obtained is squared in multipliers 734 and 736. Finally, the real results are added in an adder 738 and a square root is extracted from the sum in block 740. The result is connected to a comparator 744 with a switch 742, and the comparator compares the result with the threshold value, on the basis of which it is decided whether the code phase is correct.

Even though the invention has been described with reference to an example according to the accompanying drawings, it is clear that the invention is not limited thereto, but may be modified in various ways within the scope of the inventive concept defined in the appended claims.

What is claimed is:

1. A method of performing code acquisition on a signal to be received, which is spread-coded with a pseudorandom spreading code, the method comprising:
    forming a signal-to-noise ratio estimate from the ratio of the level of the signal to be received to the level of interferences,
    forming a number of angular cells which is proportional to the signal-to-noise ratio estimate, and receiving a signal; and
    performing code acquisition by searching the angular cells formed at different delays of the spreading code,
    wherein the lower the level of the signal to be received in relation to the level of interferences, the more angular cells will be formed.

2. A method according to claim 1, forming a signal-to-noise ratio estimate and by determining the number of angular cells needed on the basis of the signal-to-noise ratio estimate.

3. A method according to claim 2, estimating, in order to form a signal-to-noise ratio estimate, the level of interferences and making an assumption on the level of the signal to be received.

4. A method according to claim 2, measuring the level of interferences, assuming that the signal to be received has a certain level and forming a signal-to-noise ratio.

5. A method according to claim 4, estimating the level of interferences, setting the probability of false alarm and forming a threshold by means of which a decision is made on synchronization.

6. A method according to claim 1, wherein the angular cells point in different directions.

7. A method according to claim 1, wherein the angular cells are adjacent but do not overlap.

8. A method of performing code acquisition on a signal to be received, which is spread-coded with a pseudorandom spreading code, the method comprising:
    forming a signal-to-noise ratio estimate from the ratio of the level of the signal to be received to the level of interferences,
    forming a number of angular cells which is proportional to the signal-to-noise ratio estimate, and receiving a signal;
    performing code acquisition by searching the angular cells formed at different delays of the spreading code; and
    selecting the number of angular cells so that the code acquisition time is minimized.

9. A method of performing code acquisition on a signal to be received, which is spread-coded with a pseudorandom spreading code, the method comprising
    forming a signal-to-noise ratio estimate from the ratio of the level of the signal to be received to the level of interferences,
    forming a number of angular cells which is proportional to the signal-to-noise ratio estimate, and receiving a signal;
    performing code acquisition by searching the angular cells formed at different delays of the spreading code; and
    assuming, in order to form the signal-to-noise ratio estimate, that the signal to be received has a desired level and forming the number of angular cells needed in reception, the number being inversely proportional to the level of interferences.

10. A method of performing code acquisition on a signal to be received, which is spread-coded with a pseudorandom spreading code, the method comprising
    forming a signal-to-noise ratio estimate from the ratio of the level of the signal to be received to the level of interferences,
    forming a number of angular cells which is proportional to the signal-to-noise ratio estimate, and receiving a signal;
    performing code acquisition by searching the angular cells formed at different delays of the spreading code; and
    performing code acquisition in a base station of a radio system and estimating the level of interferences by means of the number of users served by the base station.

11. A receiver which is arranged to perform code acquisition on a signal to be received, which is spread-coded with a pseudorandom spreading code, the receiver comprising signal-to-noise ratio estimation means for determining a signal-to-noise ratio estimate from the ratio of the level of the signal to be received to the level of interferences, wherein the receiver being arranged to
    form a number of angular cells which is proportional to the signal-to-noise ratio and receive a signal; and
    perform code acquisition by searching the angular cells formed at different delays of the spreading code,
    wherein the smaller the level of the signal to be received in relation to the level of interferences, the more angular cells the receiver is arranged to form.

12. A receiver according to claim 11, wherein the receiver is arranged to direct the angular cells in different directions.

13. A receiver according to claim 11, wherein the receiver is arranged to direct the angular cells in parallel without overlapping.

14. A receiver according to claim 11, wherein to form the signal-to-noise ratio, the receiver is arranged to estimate the level of interferences and make an assumption of the level of the signal to be received.

15. A receiver according to claim 11, wherein the receiver is arranged to measure the level of interferences, set an assumed level to the signal to be received and form the signal-to-noise ratio.

16. A receiver according to claim 11, wherein the receiver is arranged to estimate the level of interferences, set the probability of false alarm and form a threshold on the basis of which a decision is made on synchronization.

17. A receiver which is arranged to perform code acquisition on a signal to be received, which is spread-coded with a pseudorandom spreading code, the receiver comprising signal-to-noise ratio estimation means for determining a signal-to-noise ratio estimate from the ratio of the level of the signal to be received to the level of interferences, wherein the receiver being arranged to form a number of angular cells which is proportional to the signal-to-noise ratio and receive a signal; and perform code acquisition by searching the angular cells formed at different delays of the spreading code, wherein the receiver is arranged to select the number of angular cells so that the code acquisition time is minimized.

18. A receiver which is arranged to perform code acquisition on a signal to be received, which is spread-coded with a pseudorandom spreading code, the receiver comprising signal-to-noise ratio estimation means for determining a signal-to-noise ratio estimate from the ratio of the level of the signal to be received to the level of interferences, wherein the receiver being arranged to form a number of angular cells which is proportional to the signal-to-noise ratio and receive a signal; and perform code acquisition by searching the angular cells formed at different delays of the spreading code, wherein to form the signal-to-noise ratio estimate, the receiver is arranged to set the level of the signal to be received to a constant value and form the number of angular cells needed inversely proportionally with respect to the level of interferences.

19. A receiver which is arranged to perform code acquisition on a signal to be received, which is spread-coded with a pseudorandom spreading code, the receiver comprising signal-to-noise ratio estimation means for determining a signal-to-noise ratio estimate from the ratio of the level of the signal to be received to the level of interferences, wherein the receiver being arranged to form a number of angular cells which is proportional to the signal-to-noise ratio and receive a signal; and perform code acquisition by searching the angular cells formed at different delays of the spreading code, wherein the receiver is a base station of a radio system and the level of interferences is estimated by means of the number of users served by the base station.

* * * * *